United States Patent
Chang

(10) Patent No.: US 8,736,756 B2
(45) Date of Patent: May 27, 2014

(54) VIDEO SIGNAL SENDING DEVICE, RECEIVING DEVICE, AND TRANSMISSION SYSTEM

(75) Inventor: Hui-Chih Chang, Taipei (TW)

(73) Assignee: Nueteq Technology, Inc., Taipei (TW)

( * ) Notice: Subject to any disclaimer, the term of this patent is extended or adjusted under 35 U.S.C. 154(b) by 13 days.

(21) Appl. No.: 13/244,298

(22) Filed: Sep. 24, 2011

(65) Prior Publication Data
US 2013/0076978 A1    Mar. 28, 2013

(51) Int. Cl.
*H04N 7/01*    (2006.01)

(52) U.S. Cl.
USPC .......................................................... 348/441

(58) Field of Classification Search
USPC ............. 348/441, 443, 445, 448; 375/240.16, 375/240.28
See application file for complete search history.

(56) References Cited

U.S. PATENT DOCUMENTS

| | | | |
|---|---|---|---|
| 6,947,485 B2 * | 9/2005 | Owen et al. ............... | 375/240.16 |
| 7,423,693 B2 * | 9/2008 | Cole .............................. | 348/518 |
| 7,843,508 B2 * | 11/2010 | Huang .......................... | 348/441 |
| 7,869,522 B2 * | 1/2011 | Okuyama et al. ........ | 375/240.28 |
| 2007/0024746 A1 * | 2/2007 | Cole .............................. | 348/515 |
| 2008/0267222 A1 * | 10/2008 | Leung et al. .................. | 370/503 |
| 2010/0013988 A1 * | 1/2010 | Hulyalkar et al. ............ | 348/441 |
| 2010/0329339 A1 * | 12/2010 | Kanagawa ............... | 375/240.16 |
| 2011/0050850 A1 * | 3/2011 | Yamada .......................... | 348/43 |
| 2012/0098830 A1 * | 4/2012 | Kim .............................. | 345/419 |
| 2012/0154527 A1 * | 6/2012 | Dwivedula et al. ............. | 348/43 |
| 2012/0287344 A1 * | 11/2012 | Choi et al. ..................... | 348/705 |

* cited by examiner

*Primary Examiner* — Paulos M Natnael
(74) *Attorney, Agent, or Firm* — Li & Cai Intellectual Property (USA) Office

(57) ABSTRACT

A video signal sending device includes: a video dividing unit, more than one video adjusting unit and a video composite unit. Each video adjusting unit receives more than one video signal from the video dividing unit and adjusts an original frame rate of each video signal to more than one new frame rate. The video composite unit is used to combine each video signal to a composite video signal, and send the composite video signal to a remote end by a transmission channel. A maximum frame rate of the transmission channel is equal to sum of each new frame rate or the original frame rate, thereby improving the efficiency of video signal transmissions.

3 Claims, 6 Drawing Sheets

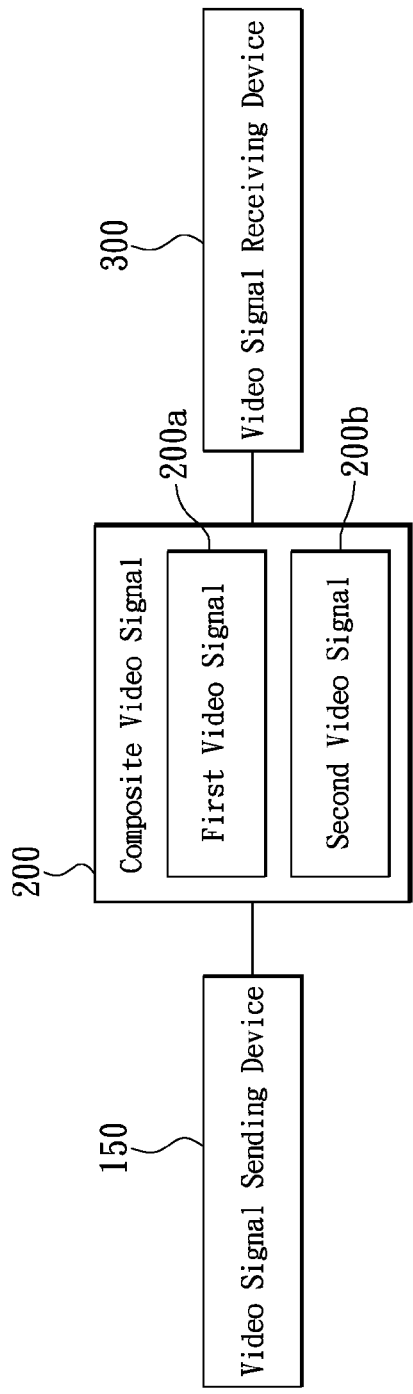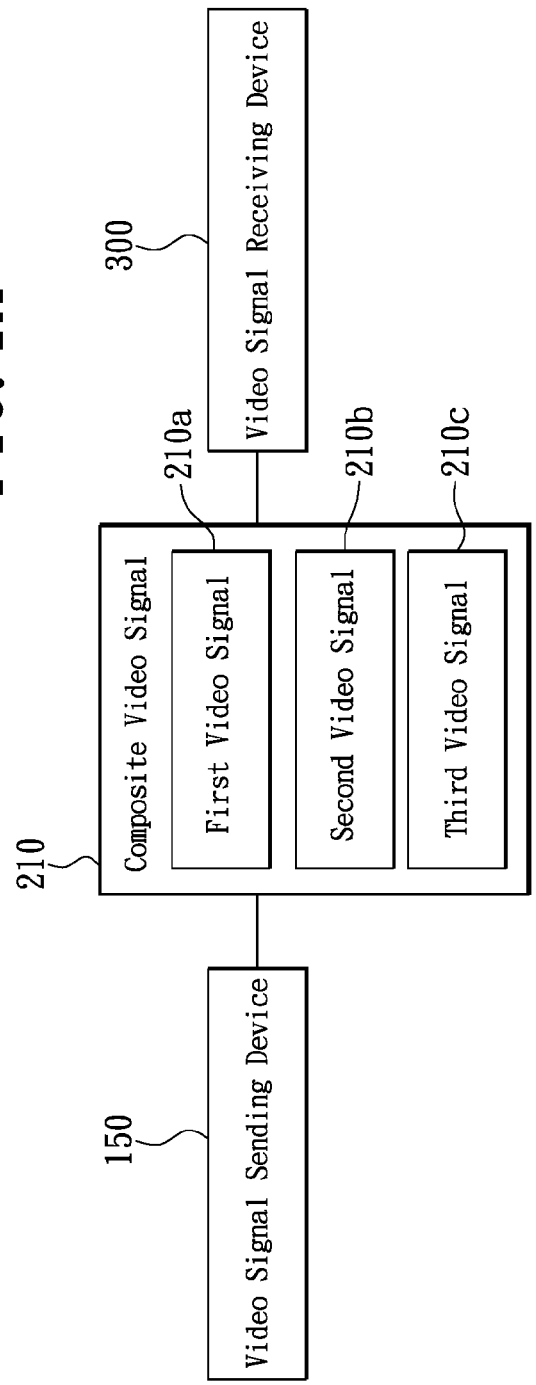

VIDEO SIGNAL SENDING DEVICE, RECEIVING DEVICE, AND TRANSMISSION SYSTEM

BACKGROUND OF THE INVENTION

1. Field of the Invention

The present invention relates to a signal transmission system; in particular, it relates to a video signal sending device, a receiving device, and a transmission system.

2. Description of Related Art

High definition video signals are typically characterized in enormous amounts of data, and consequently, during transmissions of such high definition video signals, the transmission bandwidth of the original transmission cable may limit the initially designed transmission performance. In order to effectively perform high definition video signal transmissions on the transmission cable of limited bandwidth, it is common to apply various approaches such as compressed transmission method or otherwise to replace the original transmission cable with ones offering a wider transmission bandwidth. The principle of the aforementioned compressed transmission method essentially lies in reduction of the data bandwidth consumed by multiple video signals during transmissions through compressing such video signals to be transferred at the transfer end then sending out; meanwhile, at the receive end, a corresponding decompression method is employed to restore the above-said compressed video signals, but the fidelity of the restored video signals may undesirably decrease.

On the other hand, although the approach of replacement with the transmission cable enabling a greater transmission bandwidth can resolve the issue of high definition video signal transmissions in a valid way, this solution may relatively or even unacceptably increase the cost of video signal transmissions.

Therefore, problems indeed exist in the aforementioned approaches of the compressed transmission method or transmission cable replacement; hence, providing a video signal transmission system capable of overcoming such issues has now become one critical subject to be effectively accomplished by researchers and developers in the art.

SUMMARY OF THE INVENTION

The embodiment of the present invention provides a video signal sending device, a receiving device, and a transmission device, which divides video signals into one or more sets of video signals and adjusts the frame rate during video signal transmission in order to reduce the data amounts of the video signals thereby more efficiently sending the high definition video signals under the condition of limited transmission bandwidth in the original transmission cable.

The video signal sending device according to the present invention is connected with a video device, in which the video signal sending device comprises: a video dividing unit for dividing video signals provided by the video device into one or more sets of video signals, one or more video adjusting units for respectively receiving the divided one or more sets of video signals and adjusting an original frame rate of each set of video signals to a new frame rate respectively, and a video composite unit for combining the divided video signals to composite video signals having the original frame rate and sending the composite video signals to a remote end through a transmission channel, wherein the summation of the new frame rates is less than or equal to the maximum frame rate within the bandwidth of the transmission channel.

The video signal receiving device according to the present invention is connected with a display device, in which the video signal receiving device comprises: a video separating unit for receiving the composite video signals having an original frame rate and separating the composite video signals into one or more sets of video signals having one or more new frame rates, and one or more video adjusting units, each of which being used to respectively receive each of the video signals having each of the new frame rates outputted by the video separating unit and increase or decrease each of the new frames rates of each of the video signals for outputting the video signals.

The video signal transmission system according to the present invention is respectively connected with a video device and a display device, in which the video signal transmission system comprises: a video signal sending device for receiving video signals having an original frame rate provided by the video device, dividing the received video signals into one or more sets of video signals and combining each set of the divided video signals as composite video signals having the original frame rate for sending the composite video signal, and a video signal receiving device for receiving the composite video signals having the original frame rate and separating the composite video signals into the video signals having one or more new frame rates, wherein, the video signal sending device further adjusts the original frame rate of each set of the video signals to the new frame rates before combining the composite video signals, and additionally, the video signal receiving device further increases or decreases each of the new frame rates set of the video signals after separating the composite video signals, and integrates each set of the video signals into video integrating signals and outputting to the display device.

In summary, the present invention allows effective performances of high definition video signal transmissions with the original transmission bandwidth and relative enhancement in terms of transmission bandwidth usability.

In order to further appreciate the characteristics and technical contents of the present invention, references are made to the details descriptions of the present invention as well as appended drawings therein; but, however, all such inventive details descriptions and appended drawings are merely illustrative rather than being intended to limit the claimed scope thereof in any aspect.

BRIEF DESCRIPTION OF THE DRAWINGS

FIG. 1A shows a diagram for a video signal transmission according to an embodiment of the present invention;

FIG. 1B shows a diagram for another video signal transmission according to an embodiment of the present invention;

DETAILED DESCRIPTION OF THE PREFERRED EMBODIMENTS

Embodiment of Video Transmissions

Figure 2:
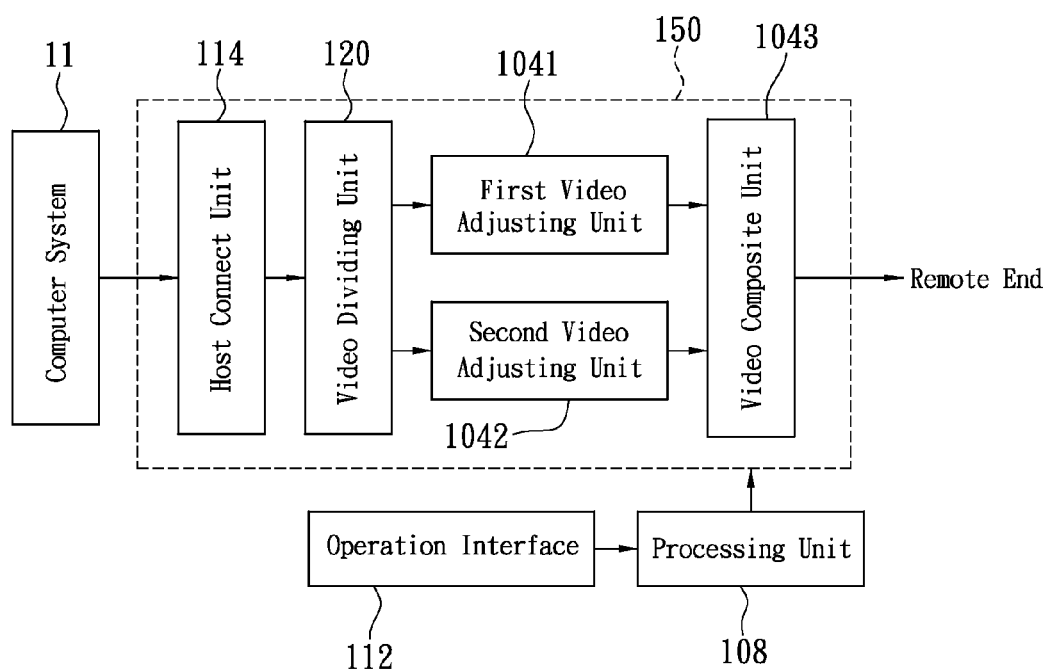
FIG. 2 shows a system block diagram of the video signal sending device according to an embodiment of the present invention.

Refer initially to FIG. 1A, wherein a diagram for a video signal transmission according to an embodiment of the present invention is shown. The video signal transmission system in FIG. 1A comprises a video signal sending device 150 and a video signal receiving device 300. The transmission channel between the video signal sending device 150 and the video signal receiving device 300 transfers a composite video signal which includes two video signals. Said transmission channel may be, for example, taken on the original transmission cable, or alternatively a CAT 5 twisted pair cable, fiber or any other Internet transmission medium, or else a bus cable. Besides, the number of said video signals in transmission may be two or more, and the data amount, rate or type of said video signal may vary.

The video signal sending device 150 allows the dividing, adjusting and composite procedures thereby dividing the video signals into two video signals, individually adjusting the original frame rates of said two video signals and combining them as the composite video signal. The video signal receiving device 300 allows the separating and integrating procedures thereby receiving, separating, re-adjusting and integrating the video signals outputted by the video signal sending device 150 and frame rates thereof. The above-said frame rate refers to the screen refresh rate which represents a measure indicating the number of frames, and the unit for frame rate measurement can be Frame Per Second (FPS) or Hertz (Hz).

The composite video signal 200 in the transmission channel includes a first video signal 200a of first frame rate and a second video signal 200b of second frame rate. The sum of the first frame rate for the first video signal 200a and the second frame rate for the second video signal 200b may be the maximum frame rate allowable in the bandwidth range of the transmission channel, or alternatively the original frame rate as described above, and the first frame rate or the second frame rate can be less than the original frame rate. In addition, in case of other design requirements, the sum of the first frame rate and the second frame rate can be also less than the original frame rate.

For example, upon receiving the video signal of original frame rate 60 Hz by the video signal sending device 150, the receive video signal can be divided into the first video signal 200a and the second video signal 200b by means of the dividing procedure in the video signal sending device 150. Next, through the adjust procedure thereof, it is possible to adjust the first video signal 200a having the original frame rate 60 Hz into the first video signal 200a of first frame rate 30 Hz. Similarly, the adjust procedure of the video signal sending device 150 can also adjust the second video signal 200b having the original frame rate 60 Hz into the second video signal 200b of second frame rate 30 Hz. At this moment, the sum of the first frame rate 30 Hz for the first video signal 200a and the second frame rate 30 Hz for the second video signal 200b can be the maximum frame rate allowable in the bandwidth range of the transmission channel, or the original frame rate 60 Hz. Following this, through the composite procedure, the first video signal 200a and the second video signal 200b can be combined into a composite video signal 200 and sent out by way of the transmission channel.

Subsequently, when the video signal receiving device 300 receives the first video signal 200a of first frame rate 30 Hz and the second video signal 200b of second frame rate 30 Hz, it is possible, by means of the separating and adjusting procedures in the video signal receiving device 300, to adjust the first video signal 200a of first frame rate 30 Hz to the first video signal 200a of the original frame rate 60 Hz. Likewise, the adjust procedure of the video signal receiving device 300 can also adjust the second video signal 200b of second frame rate 30 Hz back to the second video signal 200b of the original frame rate 60 Hz.

Since a proportional relationship exists between the frame rate and the data amount, low frame rate stands for reduced data amount. In other word, the embodiment of the present invention can implement the transmission of high definition videos under the condition of limited transmission bandwidth through data transmissions enabling video signal separation and frame rate adjustment. Additionally, by not applying conventional video data compression processes, the output quality of video signals after transmission is not affected, and in particular, the replacement with transmission cables of higher transmission bandwidth can be effectively eliminated thereby resolving the issue of increase in video signal transmission costs.

Next, refer to FIG. 1B, wherein a diagram for another video signal transmission according to an embodiment of the present invention is shown. The video signal transmission system in FIG. 1B comprises a video signal sending device 150 and a video signal receiving device 300. The transmission channel between the video signal sending device 150 and the video signal receiving device 300 transfers a composite video signal 210 which includes three video signals. The dividing, adjusting, composite, separating, re-adjusting and combining procedures configured in the video signal sending device 150 and the video signal receiving device 300 of the present embodiment are equivalent to the corresponding ones found in the previously described embodiment, thus further explanations thereof are omitted for brevity.

The composite video signal 210 in the transmission channel includes a first video signal 210a of first frame rate, a second video signal 210b of second frame rate and a third video signal 210c of third frame rate. The sum of above-said first frame rate, second frame rate and third frame rate may by the maximum frame rate allowable in the bandwidth range of the transmission channel, or otherwise the original frame rate before the adjustment performed by the video signal sending device 150. The frame rate after adjustment may be designed in accordance with the quantity of the video signals after separation. Besides, the sum of each of the frame rates can be the maximum frame rate allowable in the bandwidth range of the transmission channel or the original frame rate. Furthermore, the adjustment rules set forth previously are simply exemplary and by no means limited thereto.

Embodiment of Video Sending Device

Refer now to FIG. 2, wherein a system block diagram of the video signal sending device according to an embodiment of the present invention is shown. The video signal sending device 150 as depicted comprises: a host connect unit 114, a video dividing unit 120, a first video adjusting unit 1041, a second video adjusting unit 1042, a video composite unit 1043, a processing unit 108 and an operation interface 112.

The video signal sending device 150 is connected to a computer system 11 via the host connect unit 114 so as to receive the video signal having an original frame rate from the computer system 11. Above-said host connect unit 114 may be a Digital Video Interface (DVI) module, a High Definition Multimedia Interface (HDMI) module, a DisplayPort (DP), a Video Graphic Adapter (VGA) video or any other suitable video interface module. The first computer system 11 may be a monitor, a camcorder, a desktop computer host, a tablet computer, a server, a notebook computer, a video player (e.g., Blueray player, DVD or VCD), or any other devices conforming to HDCP technologies. The video signal sending device 150 can be also individually installed within the computer system 11 (or any other appropriate video device, switch, splitter, matrix or extender). Since said switch, splitter, matrix or extender as above are well-known to those skilled ones in the relevant signal processing art, detailed descriptions thereof are omitted for brevity.

The video dividing unit 120 is connected to the host connect unit 114. The video dividing unit 120 is used to receive video signals outputted by the host connect unit 114 and divide the received video signals into the first video signals and the second video signals. In addition, the video dividing unit 120 can also optionally divide the video signals into one or more sets of video signals, as demand. In case that the video signals are divided into one or more sets of video signals, it is possible to correspondingly increase the number of installed video adjusting units. For example, when the video signals are divided into 4 sets, the number of such video adjusting units can be correspondingly set to 4, and so forth. That is, the number of installed video adjusting units depends on the number of sets of such divided video signals.

The first video adjusting unit 1041 is connected to the video dividing unit 120. The first video adjusting unit 1041 is used to receive the first video signals having the original frame rate and adjust the original frame rate of the first video signals to the first frame rate. The first video adjusting unit 1041 can be for example a digital signal processing chip applicable for video scaling or video format conversion.

The second video adjusting unit 1042 is connected to the video dividing unit 120 as well. The second video adjusting unit 1042 is used to perform the same process on the second video signals having the original frame rate as the first video adjusting unit 1041 does on the first video signals.

The video composite unit 1043 is respectively connected to the first video adjusting unit 1041 and the second video adjusting unit 1042. The video composite unit 1043 is used to combine the first video signals outputted by the first video adjusting unit 1041 and the second video signals outputted by the second video adjusting unit 1042 into the composite video signal having the original frame rate. The frame rate of said composite video signal can be set by the user as the original frame rate, or else as the frame rate determined by other computer algorithms. The video composite unit 1043 then sends the above-said composite video signal to a remote end (or a circuit of next stage), wherein a transmission connect unit (not shown) can be selectively installed between the video composite unit 1043 and the remote end thereby converting the transmission format of the composite video signal into the transmission format according to the requirement of the transmission channel. Certainly, such a transmission connect unit can be omitted suppose said transmission format conversions are unnecessary.

The processing unit 108 is connected to the video signal sending device 150. The processing unit 108 can be used to control the video dividing unit 120 to perform the dividing procedure, the first video adjusting unit 1041 and the second video adjusting unit 1042 to perform the frame rate adjustment procedure, as well as the video composite unit 1043 to perform the video signal composite procedure. The processing unit 108 may be a central processing unit, a microcontroller, an embedded controller or a digital logic circuit etc.

The operation interface 112 is connected to the processing unit 108. The operation interface 112 may comprise one or more keys or buttons, an On-Screen Display (OSD) interface, an OSB interface or an Infrared (IR) communication interface. The operation interface 112 receives operations from the user and generates operation instructions to transfer to the processing unit 108, and the processing unit 108 further sets the frame rates outputted by the first video adjusting unit 1041 and the second video adjusting unit 1042 in accordance with the received operation instructions. In another embodiment of the present invention, if a constant mode is employed (i.e., the frame rates outputted by the first video adjusting unit 1041 and the second video adjusting unit 1042 are constant), the operation interface 112 can omitted.

Furthermore, for conveniently describing the present invention, in the embodiment of the present invention, the processing unit 108 and the operation interface 112 are installed outside of the video signal sending device 150. In a preferred embodiment, it is also possible to have the processing unit 108 and the operation interface 112 installed inside the video signal sending device 150, and the processing unit 108 can be respectively connected to the video dividing unit 120, the first video adjusting unit 1041, the second video adjusting unit 1042 and the video composite unit 1043 thereby performing relevant signal processes or transfer operations.

Embodiment of Video Receiving Device

Figure 3A:
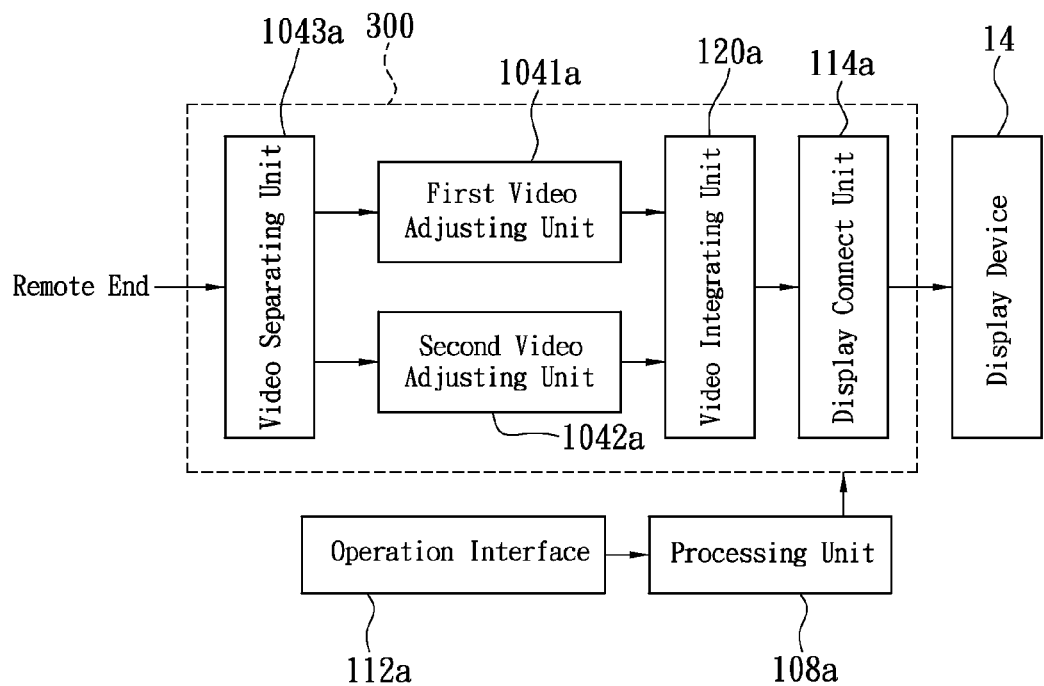
FIG. 3A shows a system block diagram of the video signal receiving device according to an embodiment of the present invention.

Refer next to FIG. 3A, wherein a system block diagram of the video signal receiving device according to an embodiment of the present invention is shown. Certain components in the video signal receiving device 300 are identical with the counterparts found in the video signal sending device 150 so the descriptions thereof are omitted for brevity. The video signal receiving device 300 as shown comprises: a first video adjusting unit 1041a, a second video adjusting unit 1042a, a video separating unit 1043a, a video integrating unit 120a, a processing unit 108a, an operation interface 112a and a display connect unit 114a.

The video separating unit 1043a receives the composite video signal having the original frame rate from a remote end. Said remote end may refer to a circuit of previous stage as well. Analogously, a transmission connect unit (not shown) may be optionally installed between the video separating unit 1043a and the remote end thereby converting the transmission format of the received composite video signal into the transmission format required by the video separating unit 1043a. Certainly, such a transmission connect unit can be omitted suppose said transmission format conversions are unnecessary. The video separating unit 1043a is used to separate the composite video signal as the first video signals of first frame rate and the second video signals of second frame rate.

The first video adjusting unit 1041a is connected to the video separating unit 1043a. The first video adjusting unit 1041a receives the first video signals having the first frame rate. The first video adjusting unit 1041a may be configured with the same functions and architecture as the first video adjusting unit 1041; specifically, the first video adjusting unit 1041a enables features of scaling adjustment and video format conversion on the first video signals. The first video adjusting unit 1041a can be used to adjust the first frame rate in the first video signals to the first original frame rate. Also, the first video adjusting unit 1041a enables increase or decrease of the first frame rate in the first video signals as other frame rate or for video format conversions in accordance with application requirement of the display device 14.

The second video adjusting unit 1042a is connected to the video separating unit 1043a. The second video adjusting unit 1042a receives the second video signals having the second frame rate. The second video adjusting unit 1042a provides the same functions and architecture as the second video adjusting unit 1042 and has the identical functions as the first video adjusting unit 1041a, so the descriptions thereof is omitted for brevity.

The processing unit 108a is connected to the video signal receiving device 300. The processing unit 108a can be used to control the video separating unit 1043 to perform the separate procedure on the video signals, the first video adjusting unit 1041a and the second adjusting unit 1042a to perform the frame rate adjustment procedure, as well as the video integrating unit 120a to perform the video signal integrating procedure. The operation interface 112a is connected to the processing unit 108a. The operation interface 112a receives operations from the user and generates operation instructions to transfer to the processing unit 108a, and the processing unit 108a further sets the frame rates outputted by the first video adjusting unit 1041a and the second video adjusting unit 1042a in accordance with the received operation instructions.

Furthermore, in another embodiment of the present invention, if a constant mode is employed (i.e., the frame rates outputted by the first video adjusting unit 1041a and the second video adjusting unit 1042a are constant), the operation interface 112a can omitted. Similarly, in a preferred embodiment, it is also possible to have the processing unit 108a and the operation interface 112a installed inside the video signal receiving device 300, and the processing unit 108a can be respectively connected to the video separating unit 1043a, the first video adjusting unit 1041a, the second video adjusting unit 1042a and the video integrating unit 120a thereby performing relevant signal processes or transfer operations.

The video integrating unit 120a is respectively connected to the first video adjusting unit 1041a and the second video adjusting unit 1042a. The video integrating unit 120a can be used to receive the first video signals and the second video signals respectively outputted by the first video adjusting unit 1041a and the second video adjusting unit 1042a and then integrate such first video signals and second video signals into a video integrating signal for output.

The display connect unit 114a is connected to the video integrating unit 120a. Besides, the display connect unit 114a can correspond to the connection socket on said interface module thereby connecting correspondingly the connection socket of the same interface in order to electrically connect to the display device 14.

The video signal receiving device 300 is connected to the display device 14 by way of the display connect unit 114a so as to transfer the integrating video signals to the display device 14 for display, thereby separately showing the first video signals and the second video signals on the screen of the display device 14, thus further facilitating the scaling effect of video doubling. Said display device 14 can be a video output apparatus such as a Cathode Ray Tube (CRT) screen or a Liquid Crystal Display (LCD) and the like. Said video signal receiving device 300 can be also individually installed within the computer system 14 (or any other appropriate display device, switch, splitter, matrix or extender).

Figure 3B:
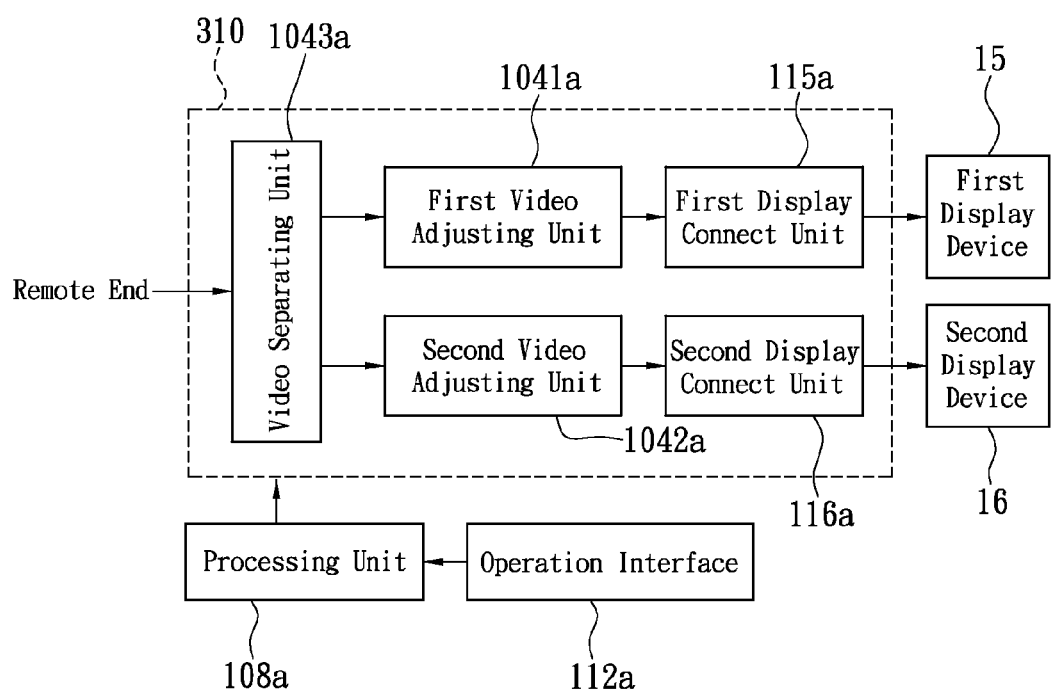
FIG. 3B shows another system block diagram of the video signal receiving device according to an embodiment of the present invention.

Refer next to FIG. 3B, wherein another system block diagram of the video signal receiving device according to an embodiment of the present invention is shown.

The difference between the embodiment in FIG. 3A and the embodiment in FIG. 3B exists in that the video integrating unit 120a is omitted in the embodiment of FIG. 3B. The first video adjusting unit 1041a is connected to the first display device 15 through a first display connect unit 115a. The second video adjusting unit 1042a is connected to the second display device 16 through a second display connect unit 116a. Certain components in the video signal receiving device 310 shown in FIG. 3B are identical with the counterparts found in the video signal receiving device 300 in FIG. 3A so the descriptions thereof are omitted for brevity.

The first display device 15 and the second display device 16 in FIG. 3B may conjunctively constitute a television wall architecture. Furthermore, the number of display devices connected with the video receiving device 300 in FIG. 3B is merely exemplary, and more than two of such display device, as well as corresponding video adjusting units and display connect units, can be additionally installed based on actual needs.

Similarly, in a preferred embodiment, it is also possible to have the processing unit 108a and the operation interface 112a installed inside the video signal receiving device 300, and the processing unit 108a can be respectively connected to the video separating unit 1043a, the first video adjusting unit 1041a and the second video adjusting unit 1042a thereby performing relevant signal processes or transfer operations.

Embodiment of Video Transmission System

Figure 4:
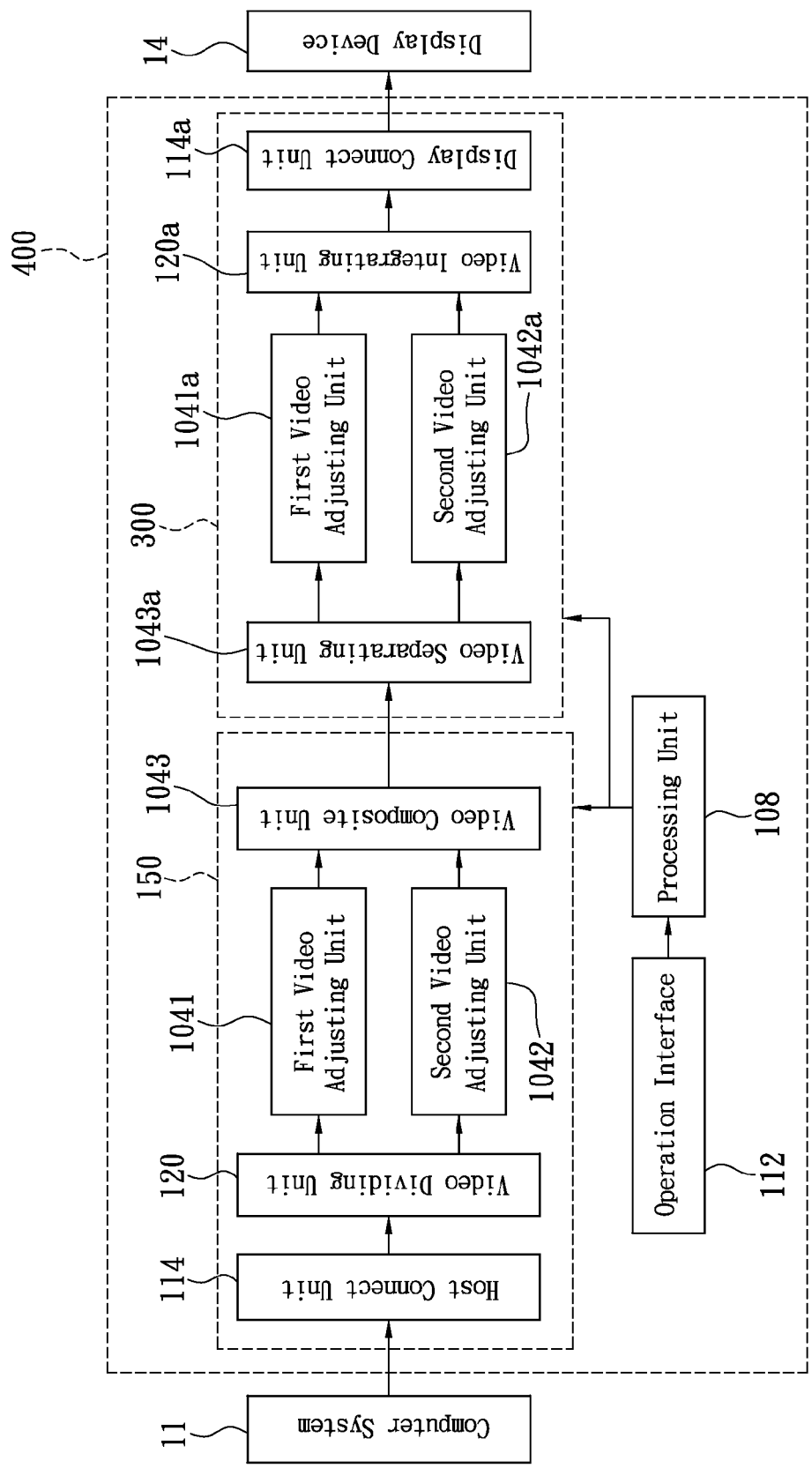
FIG. 4 shows a system block diagram of the video signal transmission system according to an embodiment of the present invention.

Subsequently refer to FIG. 4, wherein a system block diagram of the video signal transmission system according to an embodiment of the present invention is shown. The video signal transmission system 400 in FIG. 4 is respectively connected to the computer system 11 and the display device 14. The video signal transmission system comprises a video signal sending device 150 and a video signal receiving device 300. Said video signal sending device 150 and video signal receiving device 300 can be conjunctively integrated on a circuit board or within a set-up-box. Since the operation principles of the video signal sending device 150 and the video signal receiving device 300 have been explained in previous texts with reference to FIGS. 2 and 3A, details thereof are omitted for brevity. Additionally, the numbers of video adjusting units within the video signal sending device 150 and the video signal receiving device 300 are essentially equal; however, in case of other design considerations, it is also possible to increase or decrease the number of video adjusting units installed inside the video signal receiving device 300.

Figure 5A:
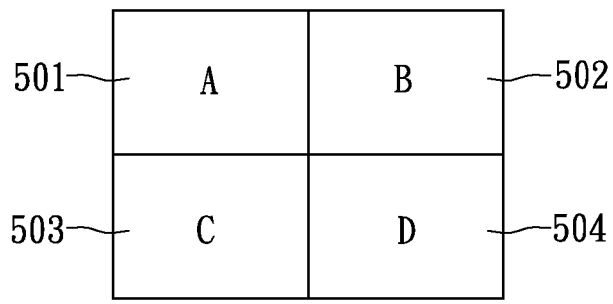
FIG. 5A shows a screen diagram of the integrated video signal according to an embodiment of the present invention.

Next, refer to FIG. 5A wherein a screen diagram of the integrated video signal according to an embodiment of the present invention is shown. The video signals, after the divide procedure, can be divided into the first video signals 501, the second video signals 502, the third video signals 503 and the fourth video signals 504. The contents in the first video signals 501 can be "A", the contents in the second video signals 502 can be "B", the contents in the third video signals 503 can be "C" and the contents in the fourth video signals 504 can be "D". After the integrating procedure, each of the divided video signals described as above can be presented on the display device 14 as the screenshot shown in FIG. 5A, and said contents "A"~"D" together constitute a complete video. Besides, the first video signals 501, the second video signals 502, the third video signals 503 and the fourth video signals 504 may all include the identical contents, such as the contents "A".

Figure 5B:
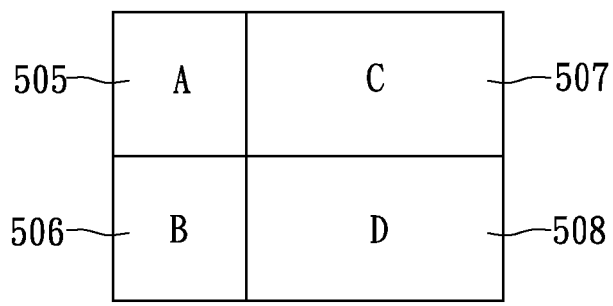
FIG. 5B shows another screen diagram of the integrated video signal according to an embodiment of the present invention.

Refer then to FIG. 5B, wherein another screen diagram of the integrated video signal according to an embodiment of the present invention is shown. As shown in FIG. 5B, the second video signals 506 can be switched in terms of position with the third video signals 507 (compared with FIG. 5A) by means of the video adjusting unit; also, the third video signals 507 and the fourth video signals 508 can be scaled up for enlarged display, and on the other hand, the first video signals 505 and the second video signals 506 can be scaled down for minified display. Above-said video adjusting unit may be installed in the video signal sending device or the video signal receiving device.

As shown in FIG. 5B, the display area of the first video signals 505 is approximately equivalent to the one of the second video signals 506. Each of the third video signals 507 and the fourth video signals 508 is individually enlarged, and the display area of the third video signals 507 is approximately equivalent to the one of the fourth video signals 508. Whereas the display area of the third video signals 507 is generally larger than the display area of the first video signals 505.

Figure 5C:
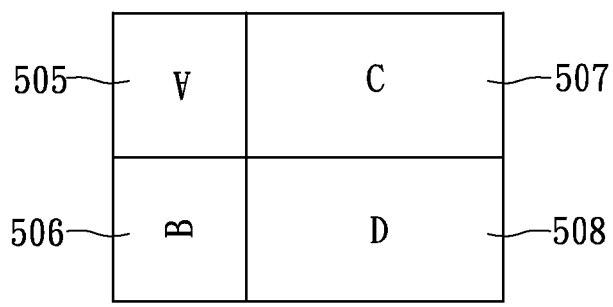
FIG. 5C shows another screen diagram of the integrated video signal according to an embodiment of the present invention.

Refer next to FIG. 5C, wherein another screen diagram of the integrated video signal according to an embodiment of the present invention is shown. As shown in FIG. 5C, the first video signals can be rotated by means of the video adjusting unit (compared with FIG. 5B), and the second video signals 506 can be also rotated 270° or 90° through the video adjusting unit. In addition, although 4 divided video signals are illustrated as an example in the aforementioned embodiment, the number of video signals that the divide procedure can generate is by no means limited thereto. The number of divided video signals can be 2, 3, 4, 6, 8, 9, 16, 24 or other positive integers greater than zero.

In summary, the present invention enables high definition video signal transmissions under the condition of original transmission bandwidth essentially by means of dividing the video signals into one or more sets of video signals at the transfer end, next adjusting the frame rate of each of the video signals and then having them combined, thereby reducing the data amounts in each of the video signals during data transmissions. Subsequently, the present invention further comprises performing video signal transmissions, restoring the frame rate in each of the video signals, combining each of the video signals and then outputting to the display device, thus improving the efficiency of video signal transmission and relatively increasing the usability of available transmission bandwidth.

The aforementioned descriptions illustrate merely the embodiments of the present invention rather than limiting the claimed scope of the present invention thereto.

What is claimed is:

1. A video signal transmission system respectively connected to a video device and a display device, comprising:
    a video signal sending device for receiving video signals having an original frame rate from the video device, dividing the received video signals into a plurality of sets and combining each set of the divided video signals as composite video signals having the original frame rate so as to transfer the composite video signals; and
    a video signal receiving device for receiving the composite video signals having the original frame rate and separating the composite video signals into video signals having one or more new frame rates;
    wherein the number of divided video signals can be 2, 3, 4, 6, 8, 9, 16, 24 or other positive integers greater than zero;
    wherein the video signal sending device further adjusts the original frame rate of each set of the video signals to the new frame rates before combining the composite video signals, and the video signal receiving device further increases or decreases the new frame rates of each set of the video signals after separating the composite video signals, and integrates each set of the video signals into integrated video signals and outputting to the display device.

2. The video signal transmission system according to claim 1, wherein the video signal sending device is installed in the video device, a switch, a splitter, a matrix, or an extender.

3. The video signal transmission system according to claim 1, wherein the video signal receiving device is installed in the display device, a switch, a splitter, a matrix, or an extender.

* * * * *